US009338485B2

(12) United States Patent
Ma et al.

(10) Patent No.: US 9,338,485 B2
(45) Date of Patent: May 10, 2016

(54) METHOD AND APPARATUS FOR DISTRIBUTING A MULTIMEDIA CONTENT

(75) Inventors: Xiao Jun Ma, Beijing (CN); Jun Li, Cranbury, NJ (US); Junbiao Zhang, Beijing (CN)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 13/320,940

(22) PCT Filed: May 11, 2010

(86) PCT No.: PCT/EP2010/056477
§ 371 (c)(1),
(2), (4) Date: Nov. 17, 2011

(87) PCT Pub. No.: WO2010/136332
PCT Pub. Date: Dec. 2, 2010

(65) Prior Publication Data
US 2012/0072538 A1 Mar. 22, 2012

(30) Foreign Application Priority Data

May 29, 2009 (EP) .................................. 09305494

(51) Int. Cl.
*G06F 15/16* (2006.01)
*H04N 21/2365* (2011.01)
(Continued)

(52) U.S. Cl.
CPC ........... *H04N 21/2365* (2013.01); *H04N 21/21* (2013.01); *H04N 21/23* (2013.01); *H04N 21/242* (2013.01); *H04N 21/2665* (2013.01)

(58) Field of Classification Search
CPC .............. H04L 41/506; H04L 65/4084; H04L 65/4076; H04L 65/601; H04L 65/602; H04N 7/04; H04N 21/43615; H04N 7/08; H04N 1/00933; H04N 21/4722; H04N 21/433; H04N 21/2387; H04N 7/173; H04N 21/2662
USPC ......... 709/203, 217, 219, 224, 230, 231, 232, 709/248, 249; 725/44, 113, 136, 144, 145, 725/151; 348/513, 584, 588
See application file for complete search history.

(56) References Cited

U.S. PATENT DOCUMENTS 6,963,590 B1  11/2005  Mann et al.
2003/0229900 A1  12/2003  Reisman
(Continued)

FOREIGN PATENT DOCUMENTS

JP  2005039515  2/2005
JP  2006211164  8/2006
(Continued)

OTHER PUBLICATIONS

Search Rept: Jun. 15, 2010.

*Primary Examiner* — Ario Etienne
*Assistant Examiner* — Kidest Mendaye
(74) *Attorney, Agent, or Firm* — Brian J. Dorini; Catherine A. Cooper

(57) ABSTRACT

A method for distributing a multimedia content to at least two rendering devices, wherein said multimedia content comprises at least two elementary contents, the method comprises the steps of receiving first information including information indicating for each of said at least two elementary contents a destination rendering device and a starting time; for each rendering device associated with said multimedia content, sending corresponding information indicating starting time for at least one elementary content destined to the rendering device; receiving said multimedia content; and sending said at least two elementary contents of said multimedia content to their corresponding destination rendering devices based on information indicating destination rendering device for each of said at least two elementary contents.

4 Claims, 13 Drawing Sheets

(51) Int. Cl.
*H04N 21/21* (2011.01)
*H04N 21/23* (2011.01)
*H04N 21/242* (2011.01)
*H04N 21/2665* (2011.01)

(56) References Cited

U.S. PATENT DOCUMENTS

| | | | |
|---|---|---|---|
| 2004/0004631 A1* | 1/2004 | Debique | H04L 29/06 715/704 |
| 2006/0149850 A1 | 7/2006 | Bowman | |
| 2006/0164326 A1 | 7/2006 | Date | |
| 2007/0006063 A1* | 1/2007 | Jewsbury | G11B 27/005 715/255 |
| 2007/0067797 A1* | 3/2007 | Lee | H04N 7/165 725/35 |
| 2007/0208810 A1* | 9/2007 | Mostafa | H04L 51/063 709/206 |
| 2007/0250873 A1 | 10/2007 | Ohyama et al. | |
| 2007/0268404 A1 | 11/2007 | Maertens et al. | |
| 2008/0005350 A1 | 1/2008 | Logvinov | |
| 2008/0046944 A1* | 2/2008 | Lee | H04N 21/2221 725/110 |
| 2008/0162665 A1 | 7/2008 | Kali | |
| 2008/0260115 A1 | 10/2008 | Sinha et al. | |
| 2010/0271389 A1* | 10/2010 | Douglas et al. | 345/619 |

FOREIGN PATENT DOCUMENTS

| | | |
|---|---|---|
| JP | 2006236002 | 9/2006 |
| JP | 2007274019 | 10/2007 |
| JP | 2008135985 | 6/2008 |
| JP | 2009049919 | 3/2009 |
| WO | WO2005031592 | 4/2005 |
| WO | WO2009040356 | 4/2009 |

* cited by examiner

```xml
<?xml version="1.0" encoding="ISO-8859-1"?>
 <MediaContent>
   <DeviceTable>
      <Device1/>
      <Device2/>
   </DeviceTable>
   <ContentTable>
      <Video ID="Video1" Device="Device1" Start="0" Duration="500s" Status= "PLAY">
         <Action Action1="Play" Action2="Pause" Action3="Resume" Action4="Stop"/>
      </Video>
      <Animation ID="Animation1" Device="Device1" Start="100s" Duration="100s">
         <Action Action1="Move"/>
      </Animation>
      <Audio ID="Audio1" Device="Device2" Start="0" Duration="500s" Status= "PLAY">
         <Action Action1="Play" Action2="Pause" Action3="Resume" Action4="Stop"/>
      </Audio>
   </ContentTable>
   <RelationshipTable>
      <Synchronization ContentID1="video1" ContentID2="Audio1"></Synchronization>
   </RelationshipTable>
 </MediaContent>
```

Fig. 3

```
<?xml version="1.0" encoding="ISO-8859-1"?>
 <MediaContent>
   <DeviceTable>
      <Device1/>
   </DeviceTable>
   <ContentTable>
      <Video ID="Video1" Device="Device1" Start="0" Duration="500s" Status= "PLAY">
        <Action Action1="Play" Action2="Pause" Action3="Resume" Action4="Stop"/>
      </Video>
      <Animation ID="Animation1" Device="Device1" Start="100s" Duration="100s">
        <Action Action1="Move"/>
      </Animation>
   </ContentTable>
   <RelationshipTable>
     <Synchronization ContentID1="video1" ContentID2="Audio1"></Synchronization>
   </RelationshipTable>
 </MediaContent>
```

Fig. 5

```
<?xml version="1.0" encoding="ISO-8859-1"?>
 <MediaContent>
   <DeviceTable>
      <Device2/>
   </DeviceTable>
   <ContentTable>
      <Audio ID="Audio1" Device="Device2" Start="0"
Duration="500s" Status= "PLAY">
         <Action Action1="Play" Action2="Pause"
Action3="Resume" Action4="Stop"/>
      </Audio>
   </ContentTable>
   <RelationshipTable>
      <Synchronization ContentID1="video1"
ContentID2="Audio1"></Synchronization>
   </RelationshipTable>
 </MediaContent>
```

Fig. 6

```
<?xml version="1.0" encoding="ISO-8859-1"?>
 <MediaContent>
   <DeviceTable>
      <Device1/>
      <Device2/>
   </DeviceTable>
   <ContentTable>
      <Video ID="Video1" Device="Device1" Start="0"
Duration="500s" Status= "PLAY">
        <Action Action1="Play" Action2="Pause"
Action3="Resume" Action4="Stop"/>
      </Video>
      <Animation ID="Animation1" Device="Device2"
Start="100s" Duration="100s">
        <Action Action1="Move"/>
      </Animation>
      <Audio ID="Audio1" Device="Device2" Start="0"
Duration="500s" Status= "PLAY">
        <Action Action1="Play" Action2="Pause"
Action3="Resume" Action4="Stop"/>
      </Audio>
   </ContentTable>
   <RelationshipTable>
      <Synchronization ContentID1="video1"
ContentID2="Audio1"></Synchronization>
   </RelationshipTable>
 </MediaContent>
```

Fig. 9

```
<?xml version="1.0" encoding="ISO-8859-1"?>
 <MediaContent>
   <DeviceTable>
      <Device1/>
   </DeviceTable>
   <ContentTable>
      <Video ID="Video1" Device="Device1" Start="0"
Duration="500s" Status= "PLAY">
         <Action Action1="Play" Action2="Pause"
Action3="Resume" Action4="Stop"/>
      </Video>
   </ContentTable>
   <RelationshipTable>
      <Synchronization ContentID1="video1"
ContentID2="Audio1"></Synchronization>
   </RelationshipTable>
 </MediaContent>
```

Fig. 10

```xml
<?xml version="1.0" encoding="ISO-8859-1"?>
 <MediaContent>
   <DeviceTable>
      <Device2/>
   </DeviceTable>
   <ContentTable>
      <Animation ID="Animation1" Device="Device2" Start="100s" Duration="100s">
         <Action Action1="Move"/>
      </Animation>
      <Audio ID="Audio1" Device="Device2" Start="0" Duration="500s" Status= "PLAY">
         <Action Action1="Play" Action2="Pause" Action3="Resume" Action4="Stop"/>
      </Audio>
   </ContentTable>
   <RelationshipTable>
      <Synchronization ContentID1="video1" ContentID2="Audio1"></Synchronization>
   </RelationshipTable>
 </MediaContent>
```

Fig. 11

```
<?xml version="1.0" encoding="ISO-8859-1"?>
 <MediaContent>
   <DeviceTable>
      <Device1/>
      <Device2/>
   </DeviceTable>
   <ContentTable>
      <Video ID="Video1" Device="Device1" Start="0"
Duration="500s" Status= "PAUSE">
         <Action Action1="Play" Action2="Pause"
Action3="Resume" Action4="Stop"/>
      </Video>
      <Animation ID="Animation1" Device="Device1"
Start="100s" Duration="100s">
         <Action Action1="Move"/>
      </Animation>
      <Audio ID="Audio1" Device="Device2" Start="0"
Duration="500s" Status= "PAUSE">
         <Action Action1="Play" Action2="Pause"
Action3="Resume" Action4="Stop"/>
      </Audio>
   </ContentTable>
   <RelationshipTable>
      <Synchronization ContentID1="video1"
ContentID2="Audio1"></Synchronization>
   </RelationshipTable>
 </MediaContent>
```

Fig. 12

```xml
<?xml version="1.0" encoding="ISO-8859-1"?>
 <MediaContent>
   <DeviceTable>
     <Device1/>
   </DeviceTable>
   <ContentTable>
     <Video ID="Video1" Device="Device1" Start="0" Duration="500s" Status= "PAUSE">
        <Action Action1="Play" Action2="Pause" Action3="Resume" Action4="Stop"/>
     </Video>
     <Animation ID="Animation1" Device="Device1" Start="100s" Duration="100s">
        <Action Action1="Move"/>
     </Animation>
   </ContentTable>
   <RelationshipTable>
     <Synchronization ContentID1="video1" ContentID2="Audio1"></Synchronization>
   </RelationshipTable>
 </MediaContent>
```

Fig. 13

```xml
<?xml version="1.0" encoding="ISO-8859-1"?>
<MediaContent>
   <DeviceTable>
      <Device2/>
   </DeviceTable>
   <ContentTable>
      <Audio ID="Audio1" Device="Device2" Start="0" Duration="500s" Status= "PAUSE">
         <Action Action1="Play" Action2="Pause" Action3="Resume" Action4="Stop"/>
      </Audio>
   </ContentTable>
   <RelationshipTable>
      <Synchronization ContentID1="video1" ContentID2="Audio1"></Synchronization>
   </RelationshipTable>
</MediaContent>
```

METHOD AND APPARATUS FOR DISTRIBUTING A MULTIMEDIA CONTENT

CROSS-REFERENCE TO RELATED APPLICATIONS

This application claims the benefit, under 35 U.S.C. §365 of International Application PCT/EP2010/056477, filed May 11, 2010, which was published in accordance with PCT Article 21(2) on Dec. 2, 2010 in English and which claims the benefit of European patent application No. 09305494.8, filed May 29, 2009.

TECHNICAL FIELD

The present invention relates to data communication, and more particularly, relates to a method and an apparatus for distributing a multimedia content to at least two rendering devices.

BACKGROUND

Multimedia is a media comprising a group of contents that utilize different content forms which comprise text, audio, still image, animation, video etc. Rich media (RM) is synonymous with interactive multimedia, i.e. rich media is a dynamic, interactive collection of multimedia data.

Currently standards relating to rich media include MPEG-4 part 20: Lightweight Application Scene Representation/Simple Aggregation Format (LASeR/SAF), 3GPP SA4 Dynamic and Interactive Multimedia Scene (DIMS), OMA (Open Mobile Alliance) BOAST Rich Media Environment Architecture etc. Other standards, such as Scalable Vector Graphics (SVG) and Synchronized Multimedia Integration Language (SMIL), both defined by the W3C (World Wide Web Consortium), can support the compilation of rich media presentations that integrate streaming audio and video with images, text and other types of materials.

Furthermore, industrial solutions supporting rich media services include Adobe flash, Microsoft Silverlight, Sun JavaFX and Nokia Mobile Open Rich-media Environment.

In current RM applications, a RM content consisting of several elementary units of content is delivered to a single client for rendering all elementary units of content on the rendering space of the single client. Herein, the action of rendering has different meanings dependent on the content to be rendered, e.g. it may mean playing an audio content; it may mean displaying a video content; and it may mean presenting a text or a still image etc.

However, it is desired to render a RM content on several rendering spaces, i.e. several devices, simultaneously. For example, in a home environment, a user wishes to watch video on a TV screen while displaying content related information on a second screen; a TV service provider wants to push interactive content to users' mobile phones in addition to traditional TV programs, to enable interactive services such as voting.

SUMMARY

According to an aspect of present invention, it provides a method for distributing multimedia content to at least two rendering devices, wherein said multimedia content includes at least two elementary units of content, the method includes the steps of receiving first information including information indicating for each of the at least two elementary units of content a destination rendering device and a starting time; for each rendering device associated with the multimedia content, sending corresponding information indicating starting time for at least one elementary units of content destined for the rendering device; receiving the multimedia content; and sending the at least two elementary units of content of the multimedia content to their corresponding destination rendering devices based on information indicating destination rendering device for each of the at least two elmentary units of content.

According to another aspect of the present invention, it provides an apparatus for distributing multimedia content to at least two rendering devices, wherein the multimedia content includes at least two elementary units of content, the apparatus includes: a receiving module configured to receiving first information of the multimedia content indicating destination rendering device and starting time for each of the at least two elementary units of content; a transmitting module configured to transmit data; a storage module configured to store the first information of the multimedia content; the storage module in communication with said receiving module; and a processing module configured to, for each rendering device associated with the multimedia content, sending corresponding information indicating starting time for at least one elementary units of content destined for the rendering device, and use the transmitting module to send the at least two elementary units of content of the multimedia content to their corresponding destination rendering devices based on the information indicating destination rendering device for each of the at least two elementary units of content, the processing module in communication with the transmitting module and the receiving module.

According to the aspect of the present invention, it provides a method to render multimedia content on two or more rendering devices.

It is to be understood that more aspects and advantages of the invention will be found in the following detailed description of the present invention.

BRIEF DESCRIPTION OF THE DRAWINGS

The accompanying drawings, which are included to provide a further understanding of the invention and are incorporated in and constitute a part of this application, illustrate embodiments of the invention together with the description which serves to explain the principle of the invention. Therefore, the invention is not limited to the embodiments. In the drawings:

FIG. 3 shows an example of a configuration file in XML format according to the present embodiment;

FIG. 5 shows the configuration file for the device1 according to the present embodiment;

FIG. 6 shows the configuration file for the device2 according to the present embodiment;

FIG. 9 shows updated configuration file for the multimedia content when the move action is performed according to the present embodiment;

FIG. 10 shows updated configuration file for the device1 when the move action is performed according to the present embodiment;

FIG. 11 shows updated configuration file for the device2 when the move action is performed according to the present embodiment;

FIG. 12 shows updated configuration file for the multimedia content when a pause action is performed according to the present embodiment;

FIG. 13 shows updated configuration file for device1 when a pause action is performed according to the present embodiment;

FIG. 14 shows updated configuration file for device2 when a pause action is performed according to the present embodiment;

DETAILED DESCRIPTION

The embodiment of the present invention will now be described in detail in conjunction with the drawings. In the following description, some detailed descriptions of known functions and configurations may be omitted for clarity and conciseness.

Figure 1:
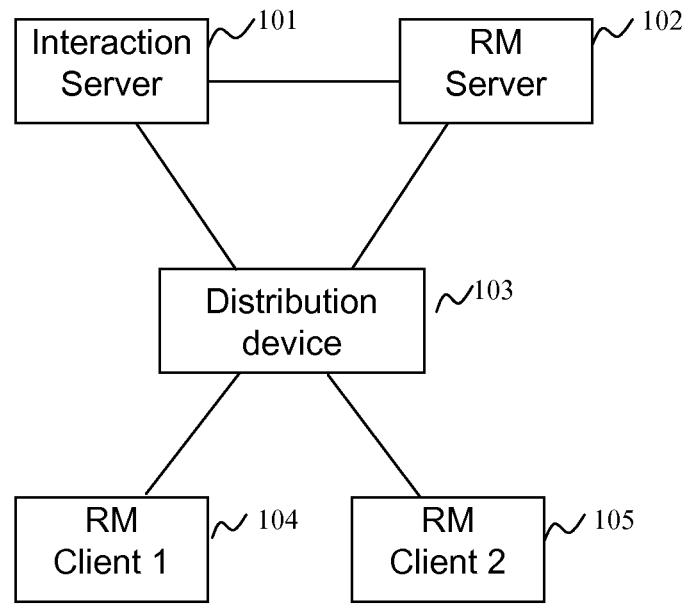
FIG. 1 is a diagram schematically illustrating a system for rendering a RM content on different devices according to an embodiment of present invention.

FIG. 1 is a diagram schematically illustrating a system for rendering a RM content on different devices according to an embodiment of present invention. The exemplary system comprises an interaction server 101, a RM server 102, a distribution device 103, and 2 RM clients 104 and 105.

The RM server 102 is configured to provide a digital multimedia content which comprises two or more elementary units of content. The elementary units of content may be in one content form of a group comprising: audio, video, animation, still image, text etc. An example of the digital multimedia content comprising a set of correlative data consists of a video, an audio, different language subtitles of a movie and its relevant advertisement. In addition, the RM server 102 may send out a configuration file along with a digital multimedia content in the beginning or before beginning to send the digital multimedia content. The configuration file is used to indicate (1) synchronization information for the elementary units of content, and (2) correspondence relationship between the elementary units of content of the multimedia content and the RM clients, i.e. indicating which elementary units of content is delivered to which destination device (i.e. RM client).

The interaction server 101 is configured to receive instructions, and control the RM server according to the instructions. The instructions may comprise an instruction for changing the destination device for a particular elementary units of content, an instruction for playing, resuming or pausing the rendering of the multimedia content. Further, functions of the interaction server and the RM server could be incorporated into a single device.

The distribution device 103 is configured to (1) receive the configuration file from the RM server 102, generate a configuration file for each destination device according to the received configuration file and send the generated configuration files to corresponding destination devices, herein, the generated configuration file for a destination device may include synchronization information and control information for the elementary units of content destined to the destination device; (2) receive a multimedia stream carrying the digital multimedia content comprising several synchronized elementary units of content from the RM server 102, derive the several synchronized elementary units of content from the received digital multimedia content, and send the derived elementary units of content to the corresponding destination devices in separate streams (called elementary streams) based on the configuration file received from the RM server 102.

The RM Client (104 or 105) is configured to receive one or more elementary units of content and configuration file for the one or more elementary units of content from the distribution device 103, and render the received one or more elementary units of content based on the configuration file. In addition, the RM client is also configured to send instructions to the interaction server 101 through the distribution device 103 so as to control the digital multimedia content, e.g. changing the destination device for one or more elementary units of content, changing the status of the digital multimedia content, such as play, pause and resume. Further, the RM client can send instructions directly to the interaction server 101.

Figure 2:
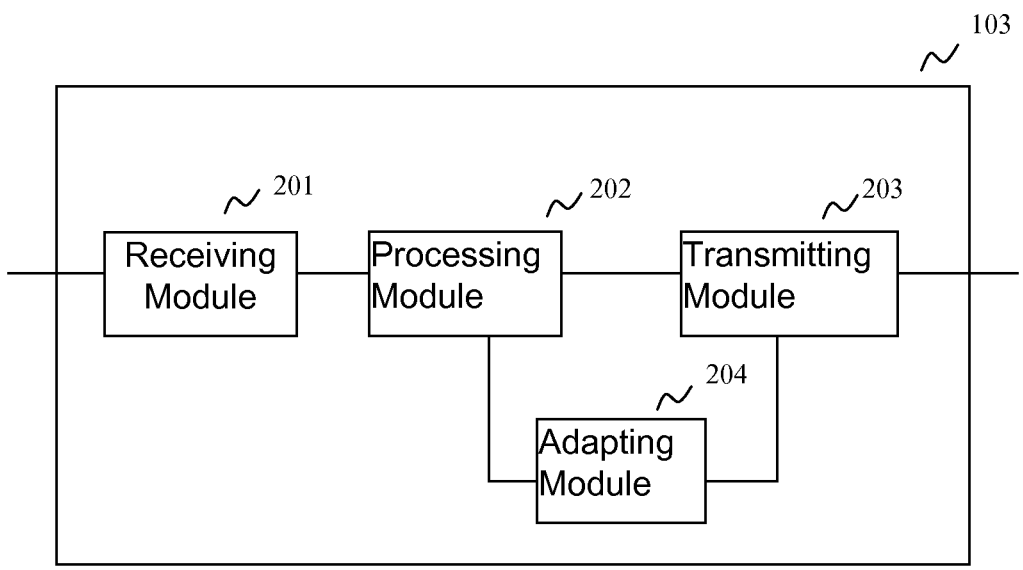
FIG. 2 is a block diagram illustrating the distribution device according to the present embodiment.

FIG. 2 is a block diagram illustrating the distribution device 103 of FIG. 1 according to the present embodiment. It comprises a receiving module 201, a transmitting module 203, a processing module 202 and an adapting module 204.

The receiving module 201 and the transmitting module 203 are used to receive and transmit data respectively.

The processing module 202 is used to demultiplex a received multimedia content so as to generate two or more elementary units of content, and to generate a configuration file for each destination RM client based on the configuration file received from the RM server.

The adapting module 204 is used to perform content adaptation by converting an elementary units of content from one data form to another, which will be more convenient for transmission or supported by the destination device. Such content adaptation comprises format conversion between different formats (e.g. AVI to RMVB), data rate adaptation, and quality adaptation by reducing the quality of the elementary units of content in order to fit the current bandwidth etc.

In addition, the distribution device 103 comprises a storage device for storing the configuration file of the requested multimedia content received from the RM server.

FIG. 3 shows an example of a configuration file in XML format sent by a RM server. In this example, the stream of a multimedia content comprises three elementary streams each carrying an elementary units of content, i.e. video1, animation1 and audio1. The multimedia content is arranged to be rendered on 2 client devices, to be specific, the video1 and animation1 will be rendered on a RM client with identifier of device1 while audio1 will be rendered on a RM client with identifier of device2. As can be seen from the FIG. 3, control information including information indicating regarding which elementary units of content is supposed to be rendered on which rendering device, when to start rendering the elementary units of content, the rendering duration etc. is contained for the elementary units of content. The video1 and audio1 will start at time 0 and last 500 seconds while animation1 will start at time of 100 second and last 100 seconds. The selectable choices for video1 and audio1 include 'play', 'pause', 'resume' and 'stop', and the choice for animation1 only includes 'move' from device1 to device2.

Figure 4:
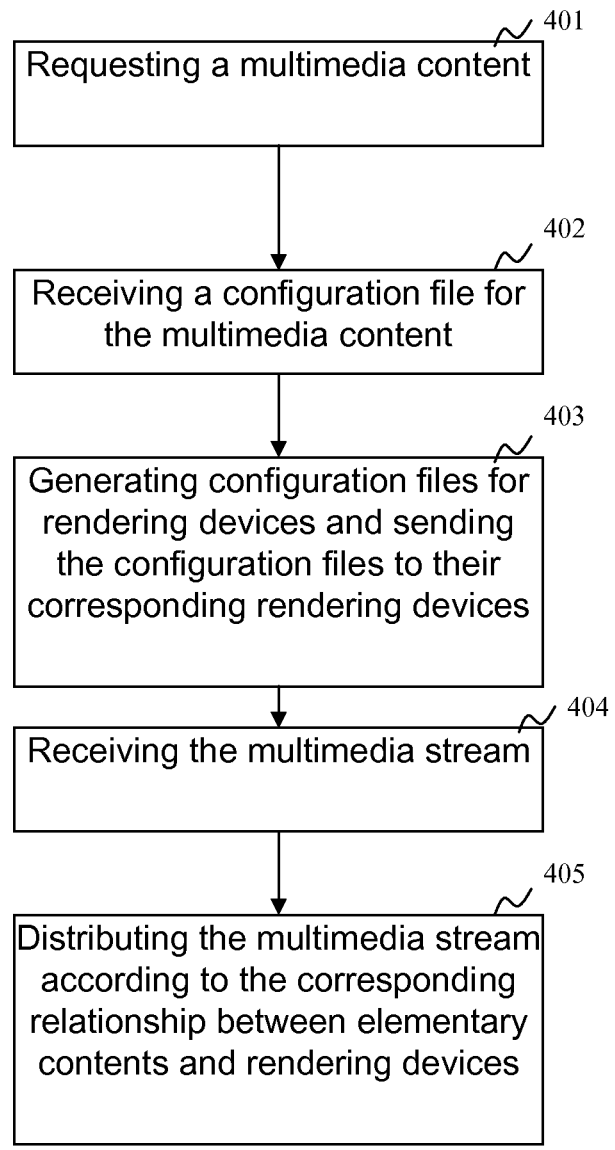
FIG. 4 is a flow chart illustrating a method for rendering a multimedia content on different rendering devices according to the present embodiment.

FIG. 4 is a flow chart illustrating a method for rendering a multimedia content on different rendering devices according to the present embodiment.

In the step 401, a user having two or more rendering devices sends a request for a multimedia content. For example, the rendering devices connect to the distribution device by using separate connections and do not communicate to each other directly. The device used by the user to send the request can be one of the rendering devices or a dedicated control device that is merely used by the user to send command. Herein, the multimedia content comprises two or more elementary units of content that are in synchronization with each other. The synchronization here not only includes the meaning of synchronization between a video and an audio, but also includes the correspondence relationship in time axis, e.g. the start time relationship between elementary units of content, in the above example, the start time of a text advertisement is 100 seconds later after the start time of a video in the same time axis.

In the step 402, the distribution device receives a configuration file from the RM server for the requested multimedia content. The configuration file may be preconfigured or dynamically generated based on user's request. Here, the configuration file shown in the FIG. 3 is used as an example for description of the present embodiment. The configuration file for the requested multimedia content indicates the control information and synchronization information for the elementary units of content. The three elementary units of content, i.e. animation1, audio1 and video1, are synchronized by using the parameter "start" and a synchronization mechanism (not shown in the FIG. 3). The parameter "start" indicates a time when an elementary units of content begins to be rendered in a time axis associated with the multimedia content. The synchronization mechanism is a mechanism used to synchronize the subsequent data of the elementary units of content during renderings of the elementary units of content. For example, timestamps associated with video and audio packets can be used to synchronize the subsequent data of video and audio. Herein, because the animation1 needn't synchronize its playback data with video1 and audio1, the animation1 is excluded from tag of "synchronization". Further, the timestamp synchronization mechanism is set to be the default synchronization mechanism. Unless otherwise indicated in the configuration file, it implicitly indicates that the timestamp synchronization mechanism will be used for the elementary units of content contained in the tag of "synchronization". Besides, other time codes that are used as a means of synchronization in file, video and audio applications can be employed. These time codes are characterized as a sequence of numeric codes generated at regular intervals by a timing system. The control information in this example indicates the destination rendering device and actions for each elementary units of content. In addition, the configuration file for requested multimedia content is stored in the distribution device.

In the step 403, the distribution device generates configuration files for rendering devices based on the configuration file received in the step 402, and sends the generated configuration files to their corresponding rendering devices respectively. FIG. 5 and FIG. 6 show configuration files for device1 and device2 respectively.

In the step 404, the distribution device receives a multimedia stream carrying the requested multimedia content.

In the step 405, the distribution device distributes the multimedia stream according to the correspondence relationship between the elementary units of content and the rendering devices, wherein, the correspondence relationship is derived from the configuration file for the multimedia content.

Figure 7:
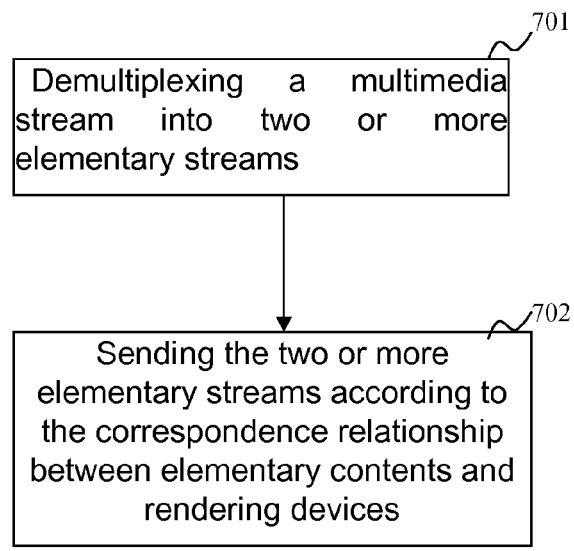
FIG. 7 is a flow chart illustrating the distribution of a multimedia stream carrying a multimedia content according to the present embodiment.

FIG. 7 is a flow chart illustrating the distribution of a multimedia stream that carries a multimedia content according to the present embodiment.

In the step 701, the distribution device demultiplexes the multimedia stream carrying the multimedia content into two or more elementary streams, each carrying an elementary units of content; and In the step 702, the distribution device sends the two or more elementary streams according to the correspondence relationship between the elementary streams and the rendering devices. In addition, the distribution device may perform content adaptation for some or all elementary units of content before sending them out.

According to a variant of the present embodiment, all elementary streams may be classified into two or more groups according to the correspondence relationship between the elementary units of content and the rendering devices, and then the two or more groups are sent accordingly. For example, a multimedia stream is demultiplexed to generate two or more groups of elementary streams corresponding to the two or more rendering devices. In the example shown in the FIG. 3, the multimedia stream is partitioned into two groups of elementary streams, for example, the group 1 including video1 and animation1 corresponds to the device1, and the group 2 including audio1 corresponds to the device2.

According to a variant of the present embodiment, the configuration file for a rendering device can be transmitted along with the transmission of the elementary units of content.

According to a variant of the present embodiment, the configuration files are set to only have information indicating destination rendering devices for elementary units of content.

According to a variant of the present embodiment, other than receiving from the RM server, the configuration file is statically configured in the distribution device or received from a dedicated control device that is used to maintain the configuration file of the multimedia content. In addition, the distribution device may periodically generate and send configuration files to corresponding rendering devices so as to make playback synchronization of all elementary units of content more accurate.

According to a variant of the present embodiment, the multimedia content is stored in one of the rendering devices. If the rendering device does not have the function of streaming, the distribution device with added streaming module will fetch the multimedia content and stream it.

According to a variant of the present embodiment, the control information and the synchronization information may be sent in separate configuration files, or determined in different ways. For example, the control information is pre-stored in the distribution device and the synchronization information is received in a configuration file. Further, it could be possible that the distribution device is used to generate the control information and/or the synchronization information.

During playback of elementary units of content on different rendering devices, an interaction message or control message may be sent by one of the rendering devices or other dedicated control device. If it is an interaction message, such as a message for vote and changing to another multimedia content, the message will be sent to the interaction server for process, which works similar to the current RM system. However, if it's a control message requesting for change of multimedia distribution, the message will be sent to the distribution device for processing either directly or through the interaction server for relaying the control message. Herein, the concept of multimedia distribution not only includes control information, such as destination device change for an elementary units of content, but also includes synchronization information, such as starting time change for an elementary units of content, synchronization mechanism change etc. In case the message is sent to the distribution device directly, the distribution device may inform the server of such change if the server needs such information for some purposes.

Figure 8:
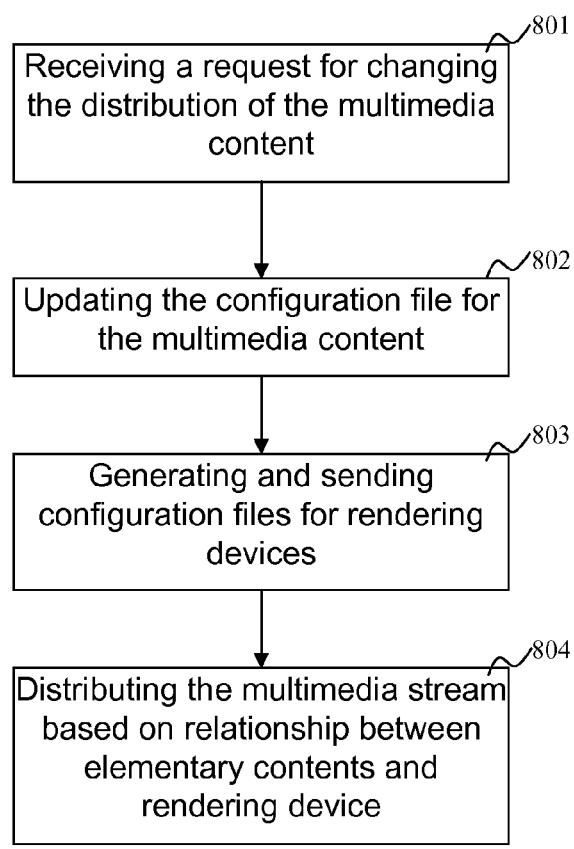
FIG. 8 is a flow chart illustrating a method for changing the distribution of a multimedia content according to the present embodiment.

FIG. 8 is a flow chart illustrating a method for changing the distribution of a multimedia content according to the present embodiment.

In the step 801, the distribution device receives a request for changing distribution of the multimedia content;
In the step 802, the distribution device updates the configuration file for the multimedia content based on the request;
In the step 803, the distribution device generates a configuration file for each rendering device and sends them to their corresponding rendering devices; and
In the step 804, the distribution device distributes the multimedia stream carrying the multimedia content based on the relationship between the elementary units of content and the rendering devices, which is derived from the updated configuration files for the multimedia content.

According to a variant of the present embodiment, the request for changing distribution of the multimedia content is sent to the RM server, and consequently the RM server generates and sends an updated configuration file for the multimedia content to the distribution device.

Still using the example shown in the FIG. 3, below is a description for changing the destination device. When the "move" action on animation1 on the device1 is triggered, the device1 sends the corresponding instruction to the distribution device. The distribution device then updates the configuration file accordingly, which is shown in the FIG. 9. After updating, the distribution device generates the configuration files for device1 and device2 (shown in FIG. 10 and FIG. 11), and sends them to device1 and device2 respectively.

The following contains a description for changing the synchronization information. When "pause" action on video1 is triggered, the video1 sends the corresponding instruction to the distribution device so as to synchronize the audio1 to the same status as video1, i.e. status of pause. FIGS. 12, 13 and 14 respectively illustrate updated configuration file in the distribution device, configuration file for device1 and configuration file for device2 according to the present embodiment.

Figure 15:
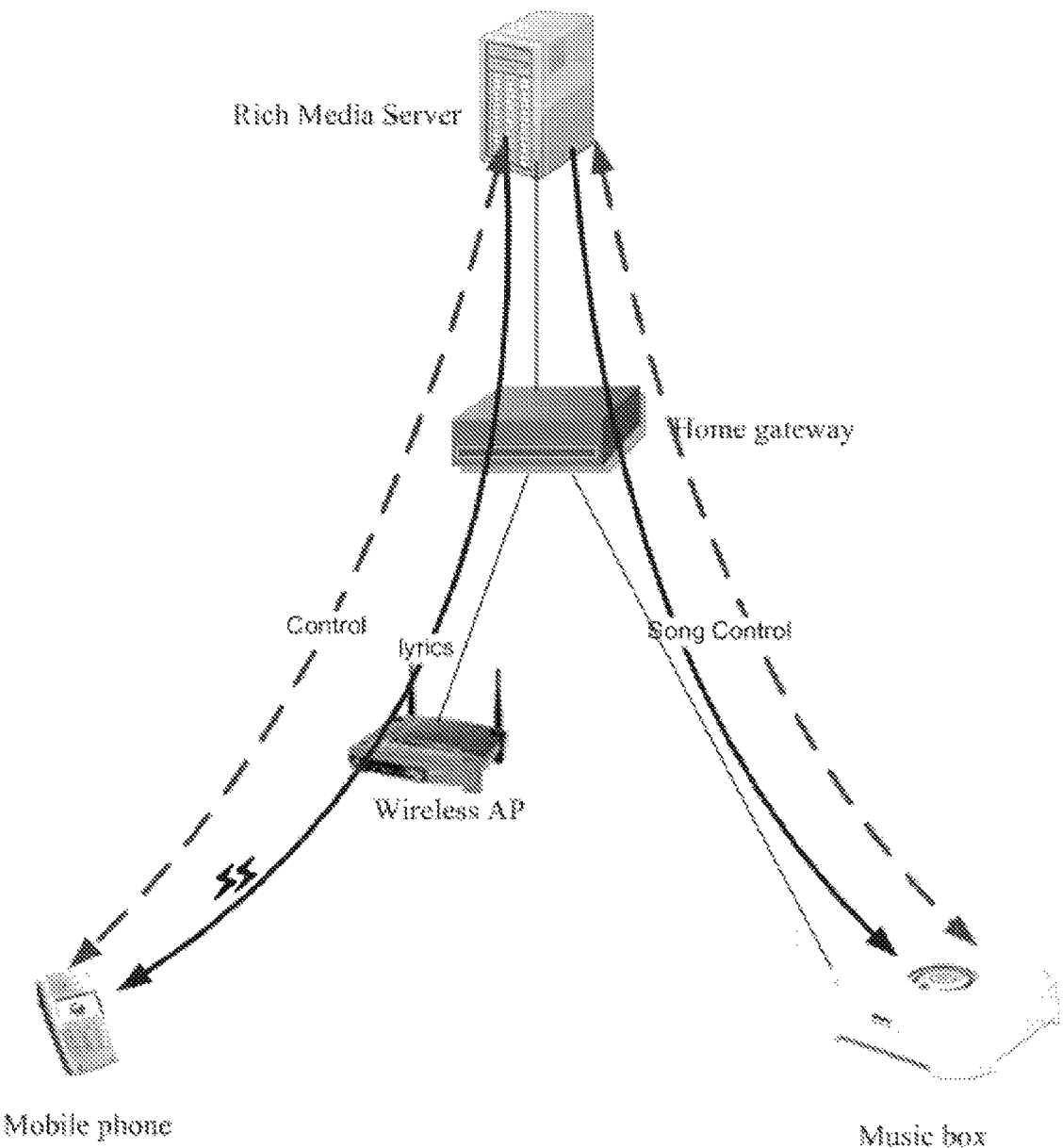
FIG. 15 is a diagram illustrating an application of the inventive method according to the present embodiment.

FIG. 15 is a system diagram illustrating an application of above introduced method according to the present embodiment. In the system, the music box capable of playing song is connected to a Home gateway via a UPnP interface; a mobile phone is connected to a wireless AP via a wireless interface. Songs, lyrics and the synchronization and control information are transmitted from the Rich Media Server. The Home gateway works as the distribution device, i.e. it delivers the song and its associated synchronization and control information to the music box for play, and delivers the lyric of the song and its associated synchronization and control information to the mobile phone for presentation. The lyric and song are synchronized by using the synchronization and control information. In addition, the mobile phone has a function to control the playback of the song and the lyric, such as play, pause, resume, by sending instructions to the Home gateway.

According to a variant of the present embodiment, the multimedia content comes from a client device other than a server, which means a multimedia content is stored in a first client device, the distribution device acquires the multimedia content from the first client device and distributes the multimedia content to several client devices, which may or may not include the first client, according to a configuration file associated with the multimedia content.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations shall fall in the scope of the invention.

The invention claimed is:

1. A method for distributing a multimedia content to at least two rendering devices by a distribution device, wherein said multimedia content comprises at least two elementary contents, the distribution device connects to the at least two rendering devices by using at least two network connections, the method comprises the steps of:
receiving, by the distribution device, first information including information indicating for each of said at least two elementary contents, a destination rendering device and a starting time; wherein the first information of said multimedia content further comprises information indicating operation instruction and selectable operation choices for each of said at least two elementary contents;
for each of said rendering devices associated with said multimedia content, generating and sending, by the distribution device over the network connection for the rendering device, corresponding information indicating the starting time for the at least one elementary content destined to the rendering device;
receiving, by the distribution device, said multimedia content;
for each of said rendering devices associated with said multimedia content, deriving and sending, by the distribution device over the network connection for the rendering device, at least one elementary content from said at least two elementary contents of said multimedia content based on information indicating destination rendering device for each of said at least two elementary contents, wherein responsive to an instruction for changing distribution of said multimedia content, the method further comprises:
receiving, by the distribution device, an instruction from the rendering device that requests to change an operation on the elementary content or destination rendering device for one or more elementary contents among said at least two elementary contents;
updating, by the distribution device, the first information based on the received instruction; and
for each of said rendering device associated with said multimedia content, sending, by the distribution device, corresponding information indicating the starting time for at least one elementary unit of content destined to the rendering device based on the updated first information.

2. The method according to claim 1, wherein, the first information further comprises information indicating that data of which two or more elementary contents among said at least two elementary contents shall be synchronized during content playback of the two or more elementary contents, and the method further comprises:

for each of said rendering devices which at least one of the two or more elementary contents to be synchronized is destined to, sending, by the distribution device, information indicating that data of which the elementary contents destined to the rendering device shall be synchronized during the playback.

3. An apparatus for distributing a multimedia content to at least two rendering devices, wherein said multimedia content comprises at least two elementary contents, the apparatus connects to the at least two rendering devices by using at least two network connections, said apparatus comprises:

a memory;

a processor coupled to the memory configured to execute programmed instructions stored in the memory comprising:

a receiving module for receiving first information of said multimedia content indicating destination rendering device and starting time for each of said at least two elementary units of contents; wherein the first information of said multimedia content further comprises information indicating operation instruction and selectable operation choices for each of said at least two elementary contents;

a transmitting module for transmitting data;

a storage for storing said first information of said multimedia content;

said processor, for each of said rendering devices associated with said multimedia content, generating and sending over the network connection for the rendering device corresponding information indicating the starting time for the at least one elementary content destined to the rendering device, and for each of said rendering device associated with said multimedia content, deriving and using the transmitting module to send over the network connection for the rendering device said at least two elementary contents of said multimedia content based on the information indicating the destination rendering device for each of said at least two elementary contents, wherein the receiving module is further used for receiving an instruction from the rendering device that requests to change an operation on the elementary content or destination rendering device for one or more elementary contents among said at least two elementary contents; and the processor is further used for updating the first information based on the received instruction, and for each of said rendering devices associated with said multimedia content, sending corresponding information indicating the starting time for at least one elementary unit of content destined to the rendering device based on the updated first information.

4. The apparatus of the according to claim 3, wherein, the first information further comprises information indicating that data of which two or more elementary contents among said at least two elementary contents shall be synchronized during content playback of the two or more elementary contents, and wherein, the processor is further used for, for each of said rendering devices which at least one of the two or more elementary contents to be synchronized is destined to, sending information indicating that data of which the elementary contents destined to the rendering device shall be synchronized during the playback.

* * * * *